United States Patent
Bacha et al.

(10) Patent No.: US 8,192,145 B2
(45) Date of Patent: Jun. 5, 2012

(54) TURBINE NOZZLE SECTOR

(75) Inventors: Jean-Luc Bacha, Paris (FR); Olivier Jean Daniel Baumas, Vert Saint Denis (FR); Lucie Lanciaux, Paris (FR); Sophie Lavison, Paris (FR)

(73) Assignee: SNECMA, Paris (FR)

( * ) Notice: Subject to any disclaimer, the term of this patent is extended or adjusted under 35 U.S.C. 154(b) by 943 days.

(21) Appl. No.: 12/185,304

(22) Filed: Aug. 4, 2008

(65) Prior Publication Data

US 2009/0041586 A1    Feb. 12, 2009

(30) Foreign Application Priority Data

Aug. 8, 2007 (FR) ...................... 07 56998

(51) Int. Cl.
*F01D 5/18* (2006.01)
(52) U.S. Cl. ...................................................... 415/115
(58) Field of Classification Search ................ 416/90 R, 416/96 A, 97 A; 415/114–116
See application file for complete search history.

(56) References Cited

U.S. PATENT DOCUMENTS

| 6,561,757 B2 * | 5/2003 | Burdgick et al. ............. 415/115 |
| 6,874,988 B2 * | 4/2005 | Tiemann ....................... 415/115 |
| 7,819,628 B2 * | 10/2010 | Dervaux et al. ............. 416/96 A |

FOREIGN PATENT DOCUMENTS

| EP | 1 277 918 A1 | 1/2003 |
| EP | 1 526 251 A1 | 4/2005 |
| WO | WO 01/98561 A2 | 12/2001 |

* cited by examiner

*Primary Examiner* — Calvin Lee
(74) *Attorney, Agent, or Firm* — Oblon, Spivak, McClelland, Maier & Neustadt, L.L.P.

(57) ABSTRACT

A turbine nozzle sector that includes an outer platform segment and an inner platform segment between which there extends one or more hollow vanes is disclosed. Each vane presents a trailing edge cavity for feeding with cooling air and communicating with a plurality of vents distributed along the trailing edge of the vane, these vents serving to exhaust a fraction of the cooling air. The cavity communicates with an air outlet hole situated level with the outer platform and enabling a fraction of the cooling air to be exhausted.

8 Claims, 4 Drawing Sheets

TURBINE NOZZLE SECTOR

The invention relates to a turbine nozzle sector, to a turbomachine fitted with a turbine having a nozzle resulting from assembling together a plurality of sectors of this type, and to a method of fabricating such as sector.

BACKGROUND OF THE INVENTION

The invention applies to any type of turbine and to any type of terrestrial or aviation turbomachine. More particularly, the invention applies to the turbines of airplane turbojets.

In the present application, the terms "upstream" and "downstream" are defined relative to the normal flow direction of fluid through the turbine. Furthermore, the axial direction corresponds to the direction of the axis of rotation of the turbine rotor, and a radial direction is a direction perpendicular to said axis of rotation. Finally, unless specified to the contrary, the adjectives "inner" and "outer" are used relative to a radial direction such that an inner (i.e. radially inner) portion or surface of an element is closer to said axis of rotation than is an outer (i.e. radially outer) portion or surface of the same element.

An airplane turbojet turbine has stationary elements (stator) and moving elements (rotor). The moving elements are moving wheels carrying blades, these moving wheels being interleaved between grids of stationary vanes, also known as nozzles. A pair comprising a nozzle and a moving wheel constitutes one stage of the turbine. To make the turbine easier to assemble, nozzles are obtained by assembling together at least two nozzle sectors.

Given the temperature of the gas passing through the turbine, the vanes of certain nozzles are hollow so as to enable them to be cooled. In two-spool turbojets, this generally applies to the vanes of the nozzle situated furthest upstream, also referred to as the first stage nozzle.

More precisely, the invention relates to a turbine nozzle sector of the type comprising an outer platform segment and an inner platform segment between which there extend one or more hollow vanes, each vane presenting a trailing edge cavity for feeding with cooling air and communicating with a plurality of vents distributed along the trailing edge of the vane, these vents serving to exhaust a fraction of the cooling air.

A known example of a sector of the above-mentioned type is shown in FIGS. 1 and 2.

FIG. 1 is a perspective view of this known example of a sector 10, and FIG. 2 is a radial section on plane II-II in FIG. 1. The sector 10 comprises an outer platform segment 2 and an inner platform segment 4, between which there extend vanes 6 for directing the stream of air in a direction that is favorable for driving the adjacent moving wheel (not shown). A plurality of sectors are assembled together to make up a nozzle. Once assembled, the segments 2 form the annular inner platform of the nozzle, and the segments 4 form the annular outer platform of the nozzle.

The vanes 6 are hollow so as to be capable of passing cooling air. The inside of each vane presents three cavities (see FIG. 2): a trailing edge cavity 16 (situated beside the trailing edge of the vane); a leading edge cavity 12 (situated beside the leading edge of the vane); and a central cavity 14 (situated between the two above-mentioned cavities). In operation, these three cavities 12, 14, and 16 are fed with cooling air. This cooling air is generally taken from the primary stream of the turbojet, from within the high-pressure turbine. The path of the cooling air is represented symbolically by arrows F.

The trailing edge cavity 16 is fed with cooling air via the central cavity 14 and communication orifices 15 (shown dotted in FIG. 2) between the two cavities 14, 16. The trailing edge cavity 16 communicates with a plurality of vents 18 (i.e. outlet channels) that are distributed of along the trailing edge of the vane and that pass through the pressure side wall 19 of the vane. The vents 18 are drawn dotted in FIG. 2. They enable a fraction of the cooling air to be exhausted along arrows f. The expelled air forms a film of air along the pressure-side wall 19, this film of air protecting the trailing edge of the vane against the hot gas passing through the turbine, and cooling the trailing edge.

The sector 10 is generally made as a casting, with the cavities 12, 14, and 16 being provided by using soluble cores. In order to enable these soluble cores to be removed, the cavities 12, 14, and 16 are originally open at their outer and inner ends (i.e. top and bottom in FIG. 2). After the cores have been removed, the outer and inner openings of the cavities are closed.

Thus, the outer opening 16a of the trailing edge cavity 16 and the inner opening 16b are closed by respective plates 20 and 22. Thus, in operation, no air is exhausted through the plates 20, 22. The plate 20 is made from a pre-sintered part that is positioned on the outer surface of the segment 2 of the outer platform and then raised in temperature, such that this pre-sintered part welds to the segment 2 by diffusion-welding.

To protect the sector 10 against oxidation and hot corrosion, a protective coating of aluminum is generally deposited on the sector by a gaseous technique. This is referred to as an aluminization method. That known method generally consists in depositing aluminum on certain portions of the sector 10 (in particular on the suction-side and pressure-side faces of the vanes 6) by using a donor that comprises aluminum, with aluminum being transported in the gaseous phase from the donor to the sector 10, in the form of an aluminum halide. This aluminum halide is formed using a gas that is generally referred to as a "vector" gas, which gas is capable of subliming under the effect of temperature to release halogen ions. These ions react with the donor to form of volatile aluminum halide. The aluminum halide may be diluted with a reducing gas or an inert gas, such as argon.

The trailing edge cavity 16 is closed by the plates 20 and 22 prior to the protective coating being deposited, since the plates 20 and 22 cannot be welded to the coating. Thus, the gas used for depositing the coating (i.e. the volatile aluminum halide and the inert gas in the above example) penetrates little or not at all into the inside of the trailing edge cavity 16. Some gas might possibly penetrate into the insides of the vents 18, but since these vents 18 are of very small section, the gas that penetrates therein does so in very small quantity and over a very short distance. The walls of the trailing edge cavity 16 are therefore not covered by the protective coating, or they are covered to a very small extent in the vicinity of the vents 18.

Several survey reports have revealed the fact that the zone C of the trailing edge cavity 16 situated close to the outer platform segment 2 and to the plate 20 suffers badly from hot corrosion. This zone C is ringed in FIG. 2. Unfortunately, it is very difficult to repair this zone C, in particular since any repair requires the plate 20 that is welded to the outer platform 2 to be removed. This leads to a high reject rate for such prior art nozzle sectors.

OBJECTS AND SUMMARY OF THE INVENTION

An object of the invention is to propose a turbine nozzle sector of the above-specified type in which the zone of the trailing edge cavity that is situated close to the outer platform segment is less subjected to hot corrosion.

This object is achieved by means of a turbine nozzle sector of the above-specified type in which the trailing edge cavity communicates with an air outlet hole situated level with the outer platform and wherein the air outlet hole is provided through a part that is fastened on the outer platform segment. When the turbine is in operation, this air outlet hole serves to exhaust a fraction of the cooling air.

In operation, the air outlet hole makes it possible to ensure that cooling air flows in the zone of the trailing edge cavity that is situated close to the outer platform segment, such that this zone is better cooled, and is therefore subjected to less hot corrosion.

In addition, and advantageously, a gaseous technique is used for depositing a protective coating on the sector, such that a fraction of the gas used for deposition passes through the air outlet hole, and the walls of the cavity situated in the vicinity of this hole are covered by the protective coating. Advantageously, the coating protects against corrosion, and the walls are even less subject to hot corrosion since they are protected by the coating. It should be observed that this advantage can be obtained with any type of anti-corrosion coating, and that the invention is therefore not limited to depositing a coating of aluminum.

In an embodiment, in order to facilitate penetration of the gas used for depositing the protective coating, the air outlet hole presents an outlet section of area are greater than or equal to 2 square millimeters ($mm^2$).

In an embodiment, the air outlet hole presents an outlet section of area that is less than or equal to 8 $mm^2$. This limits the amount of cooling air that is exhausted through the outlet hole. Exhausting too much cooling air through the outlet hole would lead, in particular, to a reduction in the rate at which air is exhausted through the vents, and that would be prejudicial to cooling the trailing edges of the vanes.

In an embodiment, the air outlet hole is made through a part that is fastened on the outer platform sector. The outlet section of the hole can thus be made and calibrated prior to the part being put into place. The part is selected to be easy to handle, such that the calibration operation can be performed easily and with a high degree of accuracy. By way of example, the part is a metal plate and it can be fastened by brazing.

It should be observed that the air outlet hole can be made in some way other than that described above. In particular, instead of being provided through a part that is fastened on the outer platform sector, the air outlet hole can be made directly through the outer platform sector. For example, when the sector is made by casting, the air outlet hole can be provided during the molding of the sector, and an optional machining step may be provided for calibrating the hole, if the accuracy of fabrication by casting is found to be insufficient. In another alternative, the air outlet hole may be defined partially by the outer platform sector and partially by a part that is fastened on the sector. In other words, said fastened part covers a fraction of the outer opening from the trailing edge cavity. By way of example, the part may be a metal plate or a pre-sintered plate.

BRIEF DESCRIPTION OF THE DRAWINGS

The invention and its advantages can be better understood on reading the following detailed description of an embodiment of the invention given by way of non-limiting illustration. The description refers to the accompanying sheets of figures, in which:

FIGS. 1 and 2 show the prior art, and they are described above.

MORE DETAILED DESCRIPTION

Figure 1:
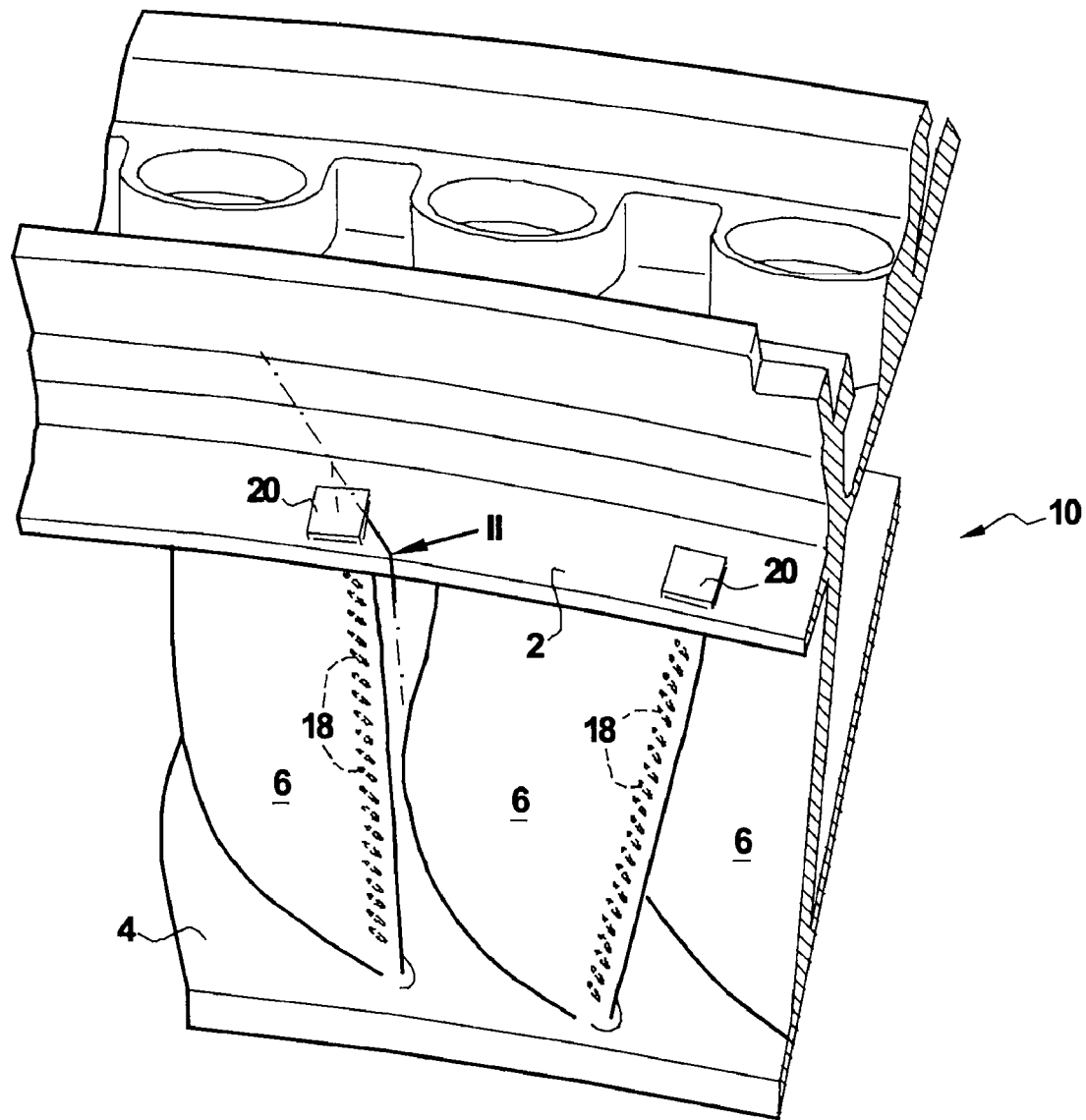
FIG. 1 is a perspective view of a prior art example of a turbine nozzle sector.
Figure 2:
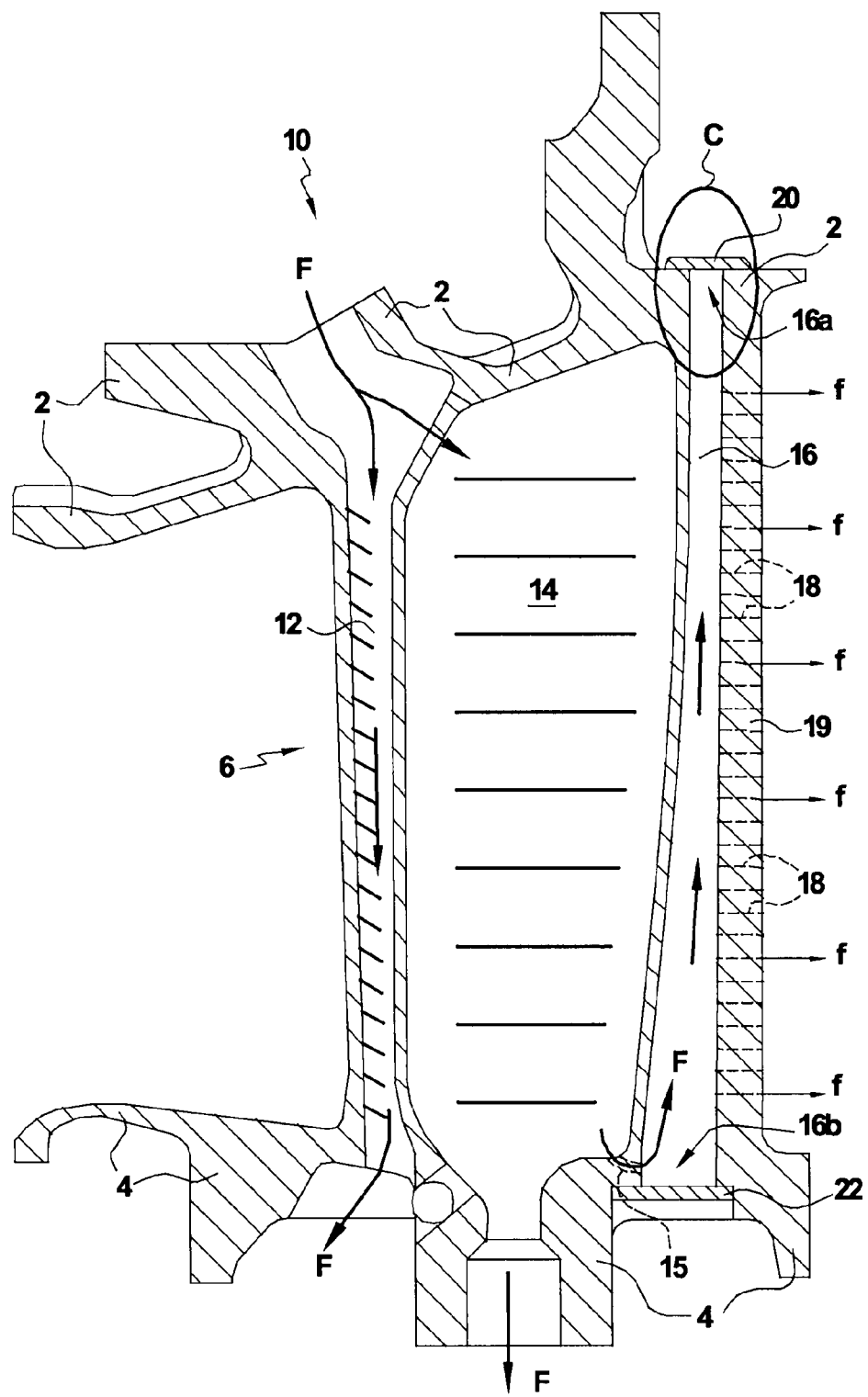
FIG. 2 is a radial section on plane II-II of FIG. 1.
Figure 3:
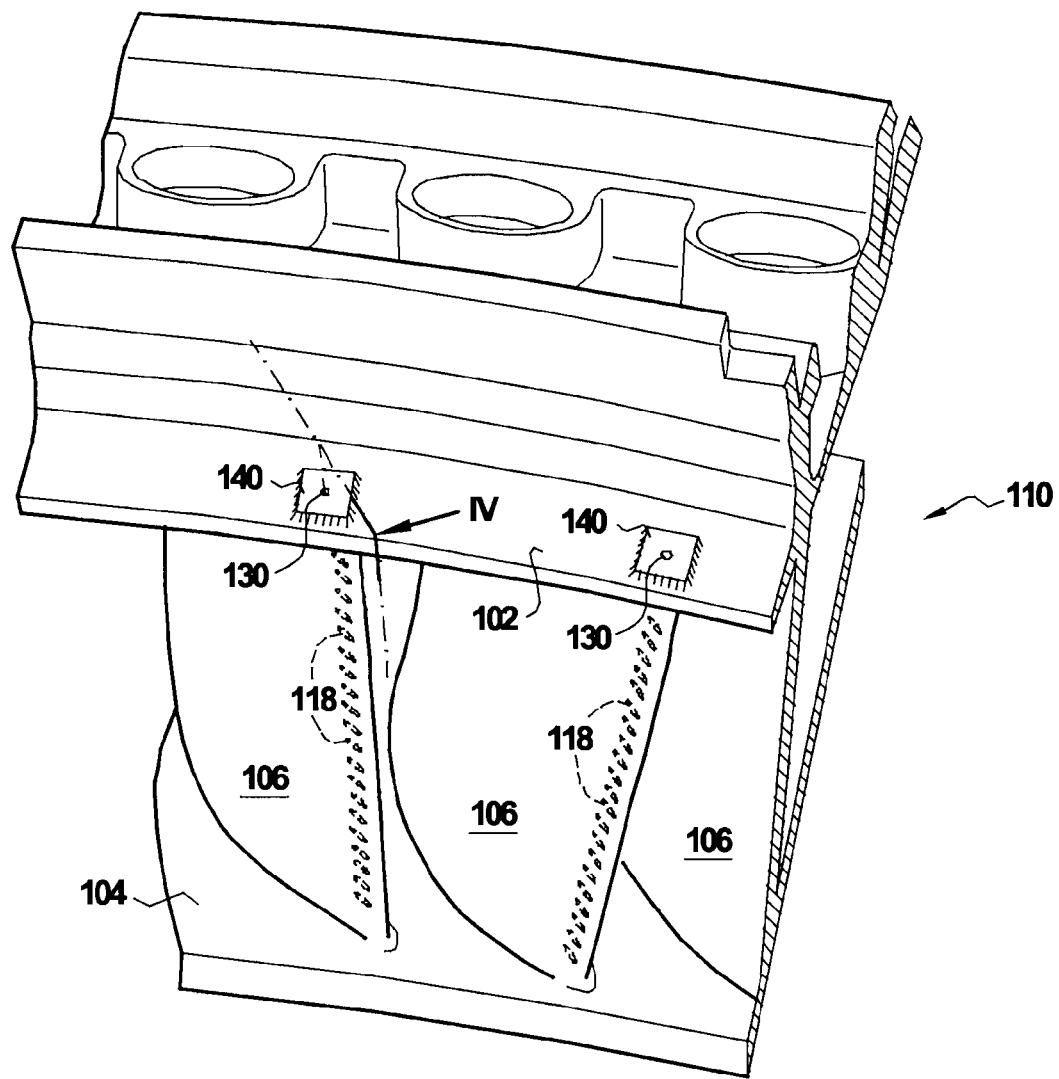
FIG. 3 is a perspective view of an example of a turbine nozzle sector of the invention.
Figure 4:
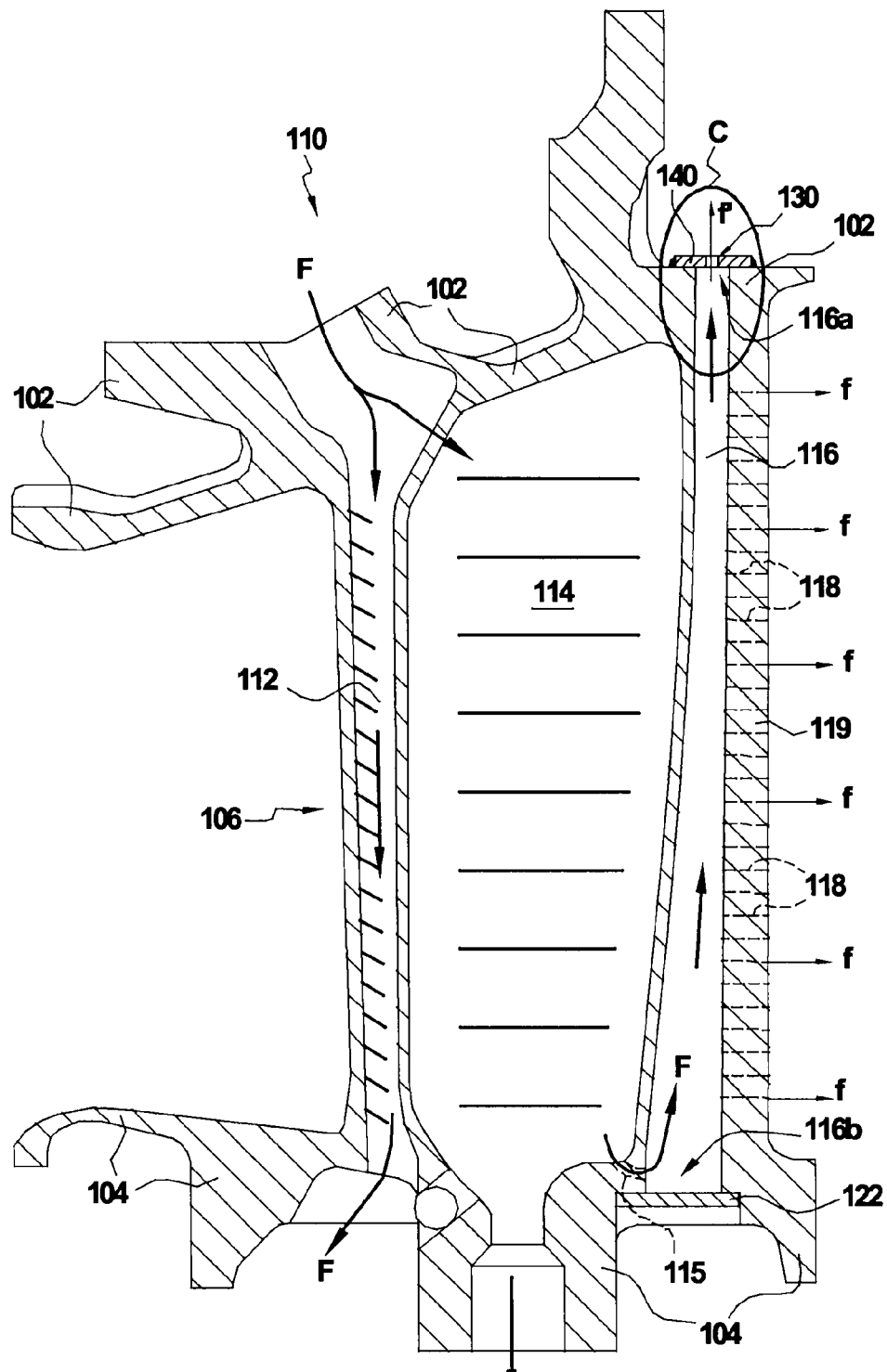
FIG. 4 is a radial section on plane IV-IV of FIG. 3.

The sector 110 shown by way of example in FIGS. 3 and 4 differs from the sector 10 of FIGS. 1 and 2 solely concerning the trailing edge cavity zone that is situated in the vicinity of the outer platform. Portions of the sector 110 that are analogous to portions of the sector 10 are thus identified by the same numerical references plus 100 and they are not described again.

The sector 110 is made by casting, and originally the trailing edge cavity 116 presents an outer opening 116a at its outer end, this outer opening 116a passing through the segment 102 of the outer platform. The outer opening 116a is useful for evacuating the soluble core that was used during molding for making the cavity 116 inside of the vane 106. In addition, the section of the outer opening 116a is of a size that is large enough to enable the core to present sufficient thickness in this location to avoid any risk of breaking. For example, the section of the outer opening 116a is generally in the form of a rectangle that is 8 mm long by 2 mm wide, giving an area of 16 $mm^2$.

After the sector 110 has been molded, a gaseous technique is used to deposit a protective coating thereon to protect it against corrosion and oxidation. By way of example, this protective coating is a coating of aluminum. The method of depositing a coating of aluminum is known and described above.

In accordance with the invention, the outer opening 116a of the trailing edge cavity is not closed: the cavity 116 communicates with an air outlet hole 130 present in the outer platform 102. In operation, this hole 130 allows a fraction of the cooling air to be exhausted along an arrow f'. There thus exists a flow of air in the cavity 116 in its zone C that is situated level with the outer platform sector 102. This flow of cooling air enables the walls of the cavity 116 to be cooled in the zone C, so these walls are less subject to hot corrosion.

Furthermore, during deposition of the protective coating by means of a gaseous technique, a fraction of the gas used for deposition purposes passes through the hole 130, and a coating is deposited on the walls of the cavity 116 situated in the zone C. These walls are thus protected by the coating against corrosion.

The outlet section of the air outlet hole 130 is sufficiently large to allow a sufficient quantity of gas to pass during deposition of the protective coating and to enable the gas to penetrate far enough into the inside of the cavity 116. However, this outlet section is sufficiently small to ensure that the flow rate of cooling air (arrow f') is not too great in operation. Thus, for example, the outlet section of the hole 130 is generally in the form of a circle having a diameter of 1.6 mm, giving an area of about 2 $mm^2$.

The air outlet hole 130 is provided through a metal plate 140. This plate 140 is rectangular or square in shape. The plate 140 is fastened by brazing onto the outer platform segment 102. The plate 140 is made of a material that is hard enough and that can withstand high temperatures so as to ensure that the area of the outlet section of the hole 130 remains constant or varies little in operation.

What is claimed is:

1. A turbine nozzle sector comprising:
an outer platform segment;
an inner platform segment; and
one or more hollow vanes extending between the outer platform segment and the inner platform segment, each vane presenting a trailing edge cavity for feeding with cooling air and communicating with a plurality of vents distributed along a trailing edge of the vane, the vents serving to exhaust a fraction of the cooling air,
wherein said cavity has an outer opening which passes through the outer platform segment and communicates with an air outlet hole, and
wherein the air outlet hole passes through a part that covers the outer opening and that is fastened on the outer platform segment, the air outlet hole enabling a fraction of the cooling air to be exhausted.

2. A turbine nozzle sector according to claim 1, wherein the air outlet hole presents an outlet section of area which is greater than or equal to 2 mm$^2$.

3. A turbine nozzle sector according to claim 1, wherein the air outlet hole presents an outlet section of area which is less than or equal to 8 mm$^2$.

4. A turbine nozzle sector according to claim 1, wherein said part is a metal plate fastened onto the outer platform segment by brazing.

5. A fabrication method comprising:
providing a turbine nozzle sector according to claim 1; and
using a gaseous technique to deposit on said sector a protective coating, such that a fraction of the gas used for deposition purposes passes through the air outlet hole and the walls of the cavity situated in the vicinity of the hole are covered by the protective coating.

6. A fabrication method according to claim 5, wherein the protective coating is a coating of aluminum.

7. A turbomachine including at least one turbine fitted with a nozzle, wherein the nozzle is the result of assembling together a plurality of nozzle sectors according to claim 1.

8. A turbomachine according to claim 7, the turbomachine being a two-spool turbojet having a high-pressure turbine and a low pressure turbine, said nozzle being the nozzle of the low pressure turbine that is first nozzle in the normal flow direction of the stream of air passing through the turbine.

* * * * *